UNITED STATES PATENT OFFICE.

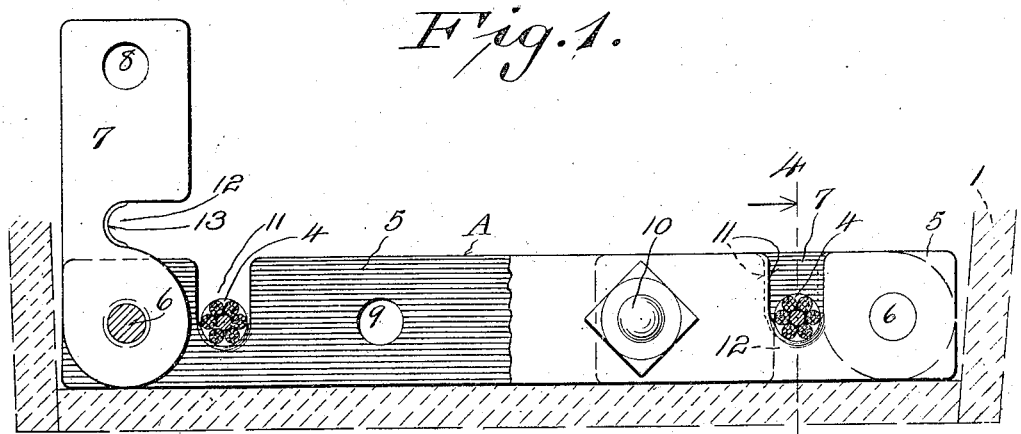

ROBERT R. SMILEY, OF GOODMAN, WISCONSIN.

CONVEYER-LAG.

1,269,013.  Specification of Letters Patent.  Patented June 11, 1918.

Application filed August 13, 1917. Serial No. 185,845.

*To all whom it may concern:*

Be it known that I, ROBERT R. SMILEY, a citizen of the United States, and resident of Goodman, in the county of Marinette and State of Wisconsin, have invented certain new and useful Improvements in Conveyer-Lags; and I do hereby declare that the following is a full, clear, and exact description thereof.

My invention relates to certain new and useful improvements in conveyers or carriers, and refers particularly to the construction of the conveyer lags or flights.

The primary object of the present invention is to provide a conveyer lag or flight capable of ready attachment to or detachment from a conveyer cable or chain and which will be of extremely simple construction.

With the above and other objects in view which will appear as the description proceeds, my invention resides in the novel construction, combination and arrangement of parts substantially as hereinafter described and particularly defined by the appended claim, it being understood that such changes in the precise embodiment of the herein disclosed invention may be made as come within the scope of the claim.

In the accompanying drawings I have illustrated one complete example of the physical embodiment of my invention constructed according to the best mode I have so far devised for the practical application of the principles thereof, in which:

Figure 1 is a view part in elevation and part in section taken on the plane indicated by dotted line 1—1 of Fig. 2, a portion of a conveyer trough being shown in conventional outlines.

Fig. 2 is a top plan view thereof.

Fig. 3 is a front view, part in section and part in elevation, of a slightly modified form of conveyer lag or flight.

Fig. 4 is a transverse sectional view through the conveyer lag taken on the plane indicated by line 4—4 of Fig. 1, and Fig. 5 is a side elevational view of a portion of one of the pulleys or sheaves employed at the ends of the conveyer.

Referring now more particularly to the accompanying drawings, the numeral 1 designates a conveyer trough which may be of any desired shape or construction, and disposed at each end of the trough is a pulley or sheave 2 having its periphery notched or recessed as at 3 to receive the conveyer lags or flights A carried by the pair of endless conveyer cables or chains 4.

The lags A are disposed on the cables 4 in spaced relation and comprise each a pair of plates 5 having pivoted therebetween near each end thereof, as at 6, a keeper 7 having in its free end an opening 8 adapted to register with openings 9 for the reception of a locking bolt 10 to retain the same in folded or locked position. The plates 5 are provided near each end thereof with a slot 11 co-acting with a corresponding slot 12 in the keeper 7 whereby to provide a cable receiving opening, as best shown in Fig. 1.

The inner curved end of the recess 12 is serrated as at 13 in order to bite or bind the cable, as depicted in Fig. 4, to prevent slipping of the lag or flight along the cables when the same is in operation. While in most instances a pair of conveyer cables are employed, still a single cable may be utilized in place of the pair of cables if desired, and if such be the case the lag is formed with a single keeper so arranged as to have the cable receiving opening in substantially the center of the lag or flight.

My invention is especially adapted for use in conveying refuse such as saw dust, shavings, or the like from a wood mill, but I have found from experience that the same may be employed for conveying numerous other materials such as stone, ore, coal, or the like in an efficient and practical manner.

I am aware that numerous forms of detachable conveyer lags have been devised and placed upon the market but in the majority of such lags now in general use, considerable time and labor is lost in removing the same from the conveyer cable, while my device is capable of immediate detachment; and should it be desired to permanently secure the lags upon the conveyer cables it is simply necessary to bur the end of the bolt 10 to thus prevent retrograde movement of the binding nut.

As best shown in Figs. 2 and 4, the openings or slots in the plates 5 and the keeper 7 are slightly out of alinement to form a kink or slight bend or twist in the cable when confined therein to prevent the slipping of the lags on the cable. The slots or openings 11 and 12 have their edges rounded, as best shown in Fig. 4, to thus prevent the wearing of the cable where it passes through the lags.

I claim:

A conveyer lag comprising a pair of spaced plates having alined keeper apertures and cable receiving recesses therein, a swinging keeper provided with a bolt aperture at its free end, said keeper being fitted between the plates and pivoted thereto, the keeper being provided with cable gripping recesses adapted to register with the cable receiving recesses in the plates when said keeper is folded between said plates to thus form a cable receiving opening, and a bolt fitted through the keeper apertures and the bolt aperture in the keeper for locking the latter to the plates in its folded position, whereby the aforesaid keeper constitutes a cable grip and reinforcing filler for the spaced plates.

In testimony that I claim the foregoing I have hereunto set my hand at Goodman, in the county of Marinette and State of Wisconsin.

ROBERT R. SMILEY.

Copies of this patent may be obtained for five cents each, by addressing the "Commissioner of Patents, Washington, D. C."